United States Patent
Bird

(10) Patent No.: US 9,155,419 B2
(45) Date of Patent: Oct. 13, 2015

(54) DISPENSER ASSEMBLY FOR A REFRIGERATOR APPLIANCE

(71) Applicant: General Electric Company, Schenectady, NY (US)

(72) Inventor: Christopher Francis Bird, Louisville, KY (US)

(73) Assignee: General Electric Company, Schenectady, NY (US)

( * ) Notice: Subject to any disclaimer, the term of this patent is extended or adjusted under 35 U.S.C. 154(b) by 130 days.

(21) Appl. No.: 14/010,610

(22) Filed: Aug. 27, 2013

(65) Prior Publication Data

US 2015/0060491 A1    Mar. 5, 2015

(51) Int. Cl.
*B65B 1/20* (2006.01)
*A47J 31/46* (2006.01)
*F25D 23/12* (2006.01)

(52) U.S. Cl.
CPC ............. *A47J 31/465* (2013.01); *F25D 23/126* (2013.01); *F25D 2400/02* (2013.01)

(58) Field of Classification Search
CPC ....... F25D 23/12; F25D 23/028; A47J 31/465
USPC .................. 141/82, 94; 222/146.1, 146.6
See application file for complete search history.

(56) References Cited

U.S. PATENT DOCUMENTS

| | | |
|---|---|---|
| 2003/0062386 A1* | 4/2003 | Derry et al. ................ 222/146.6 |
| 2004/0182104 A1* | 9/2004 | Choi .............................. 62/389 |
| 2004/0221608 A1 | 11/2004 | Jablonski |

FOREIGN PATENT DOCUMENTS

KR    20090036725    4/2009

* cited by examiner

*Primary Examiner* — Jason K Niesz
(74) *Attorney, Agent, or Firm* — Dority & Manning, P.A.

(57) ABSTRACT

A dispenser assembly for a refrigerator appliance is provided. The dispenser assembly includes a dispenser body that defines a dispenser recess. A heated liquid water outlet is configured for directing a flow of heated liquid water towards a container within the dispenser recess. The dispenser assembly also includes a cooling mechanism configured for selectively directing a flow of gaseous fluid towards the container within the dispenser recess.

18 Claims, 4 Drawing Sheets

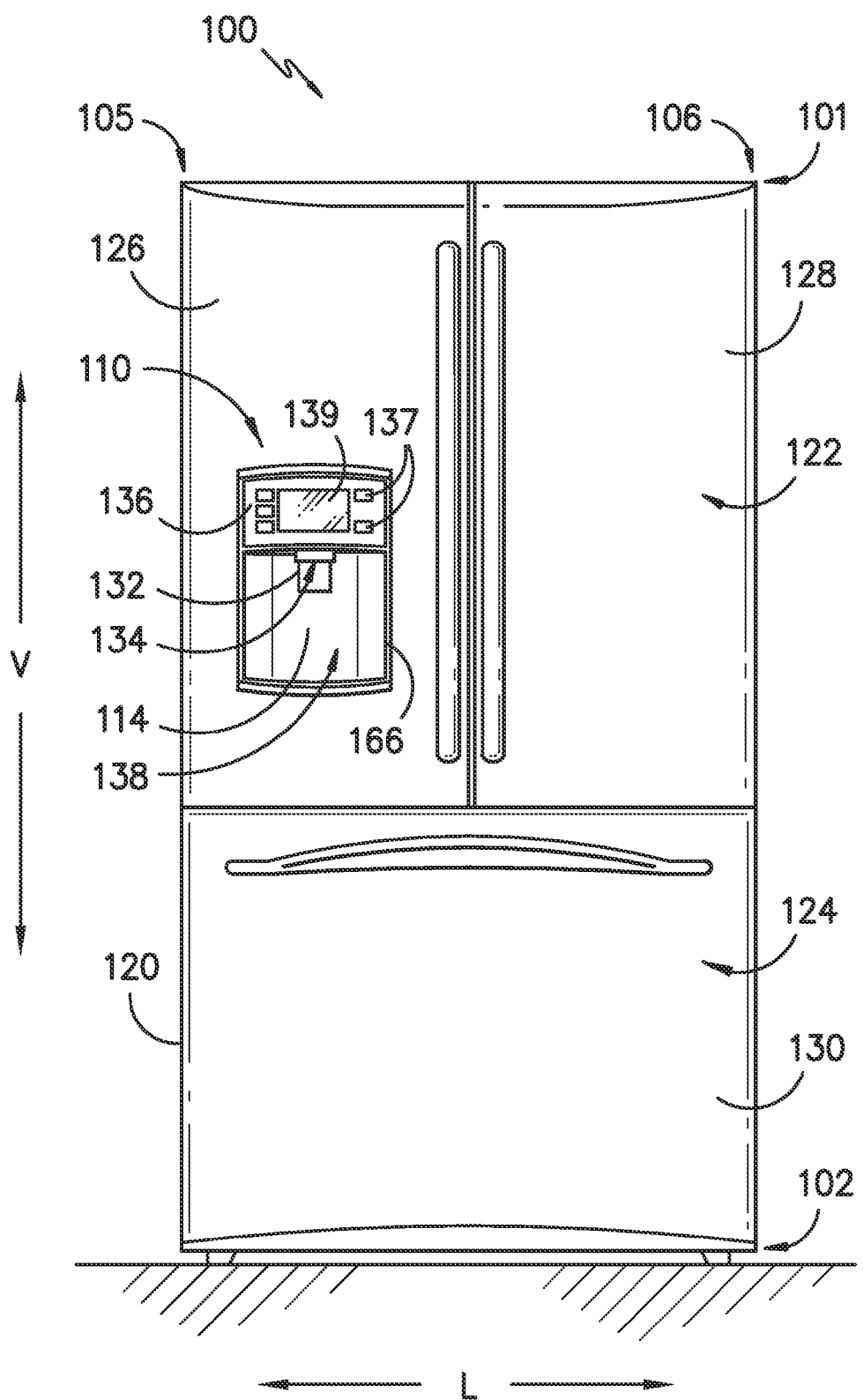
FIG. -1-

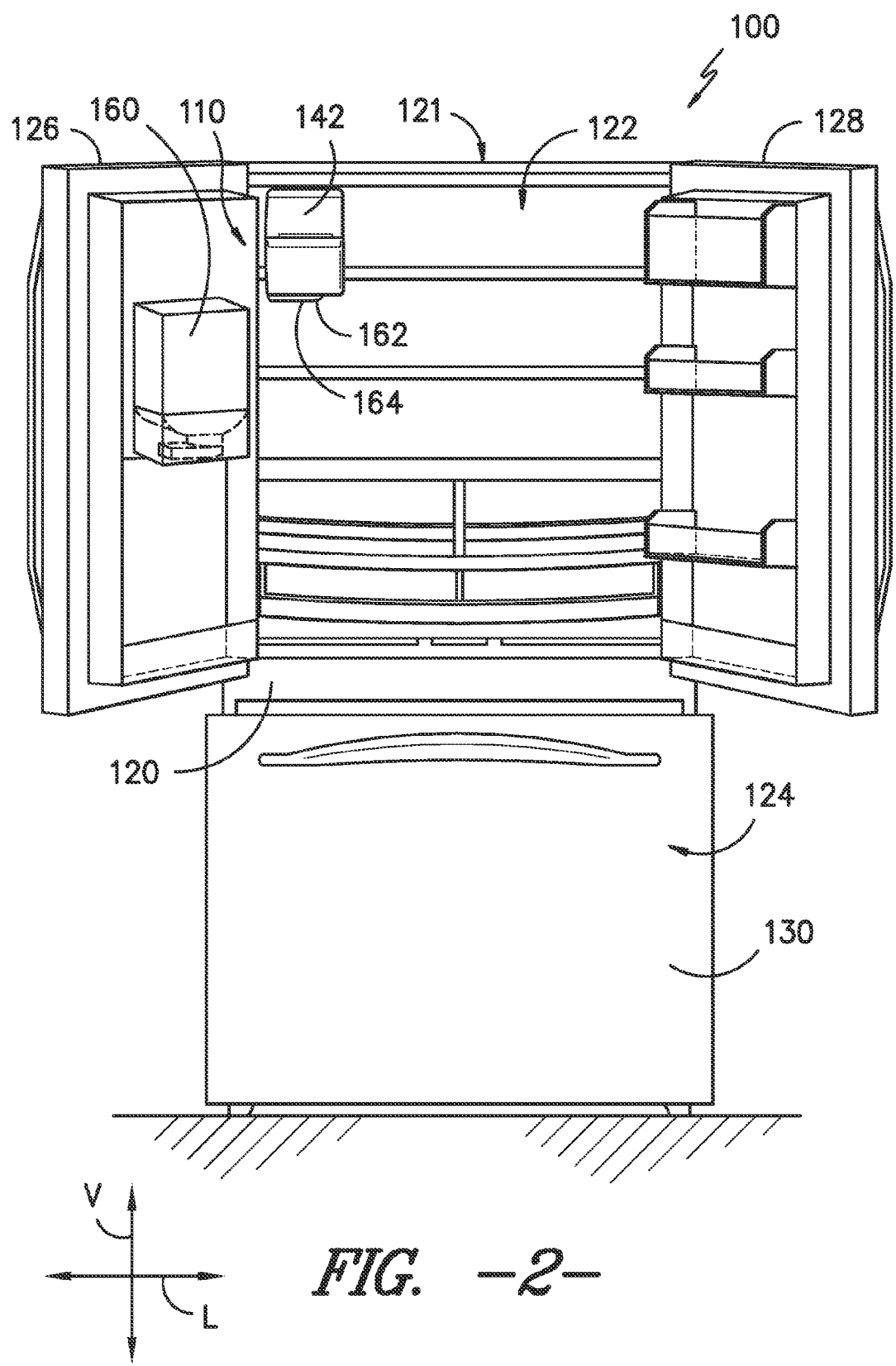
FIG. -2-

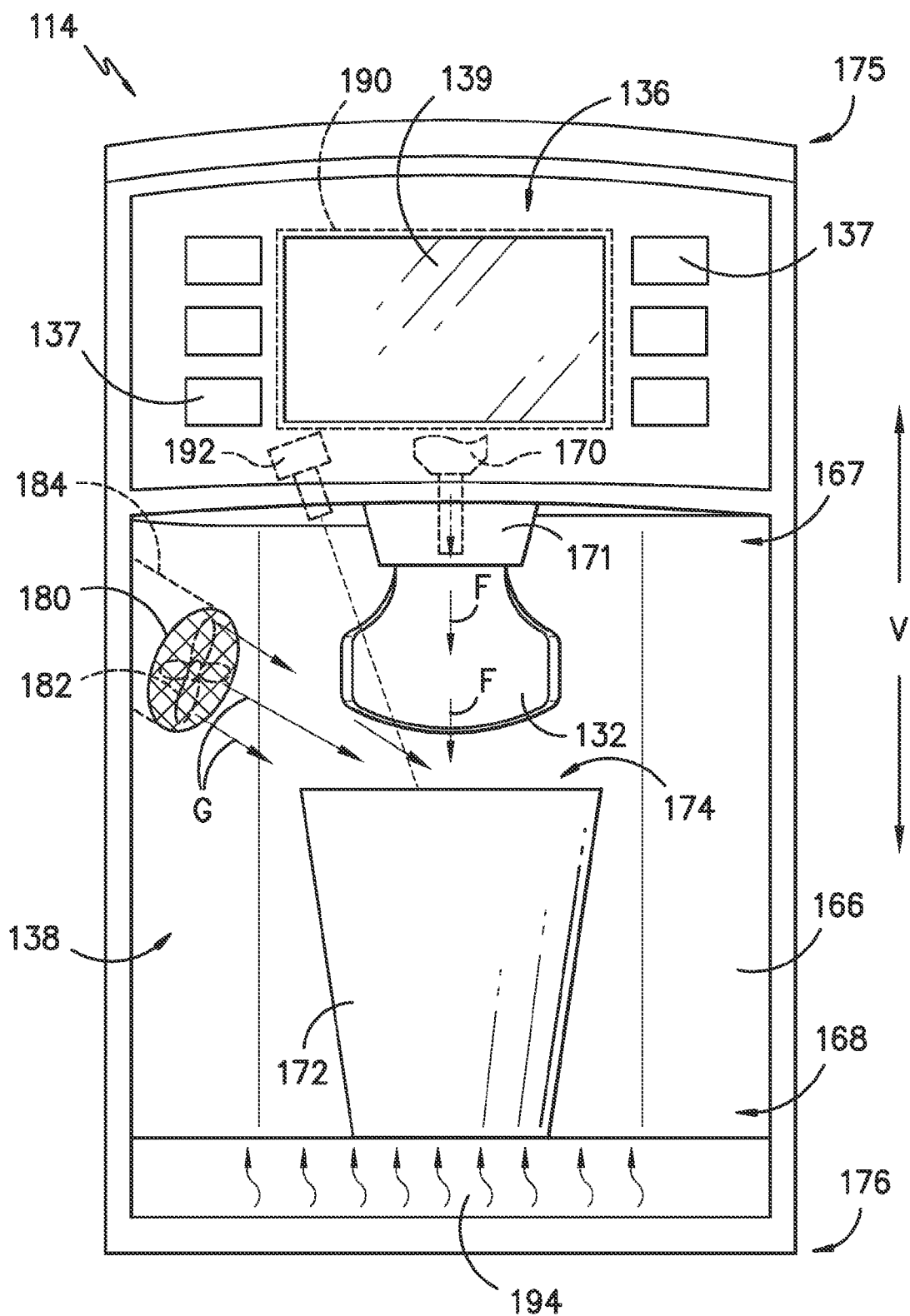
FIG. -3-

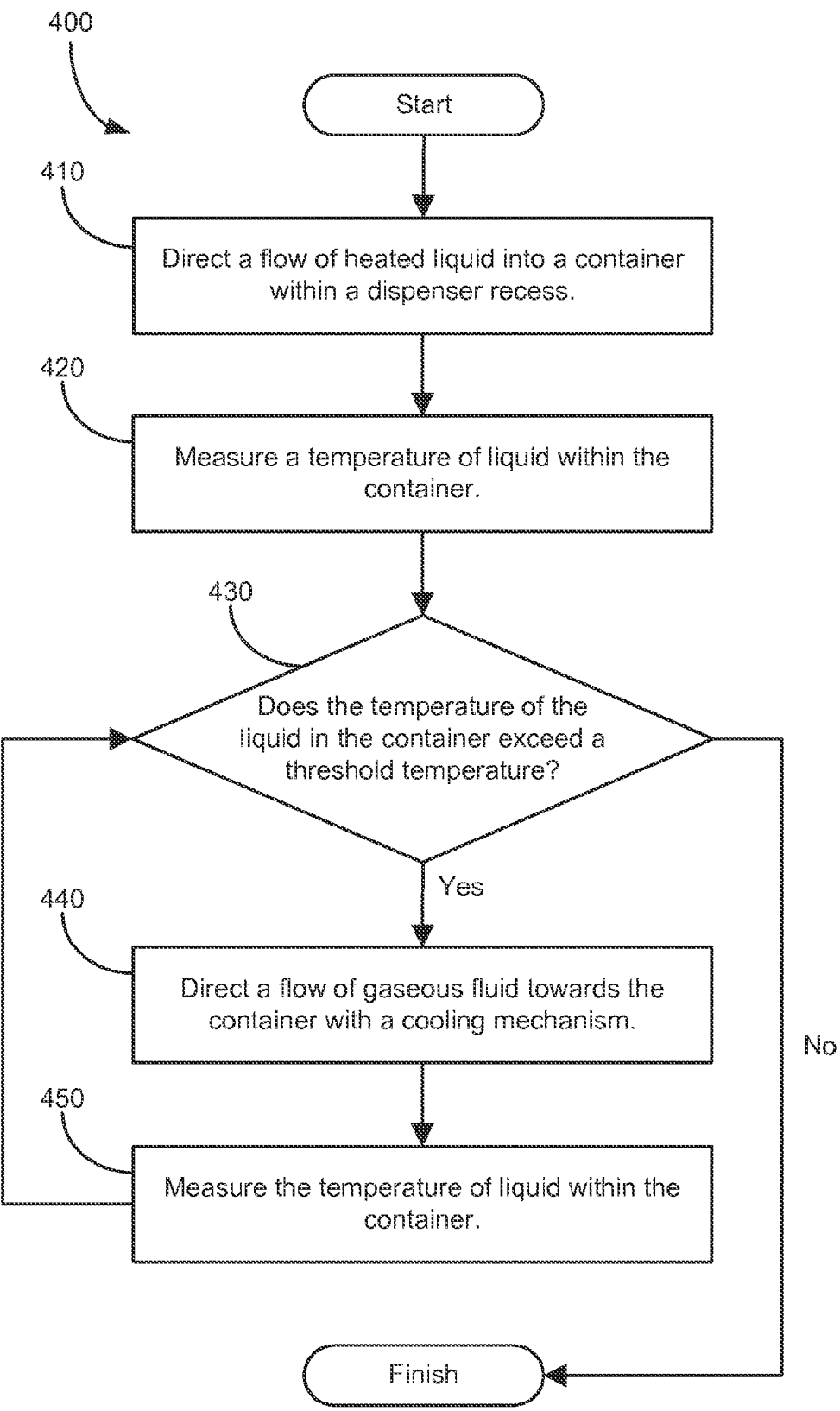
FIG. —4—

DISPENSER ASSEMBLY FOR A REFRIGERATOR APPLIANCE

FIELD OF THE INVENTION

The present subject matter relates generally to refrigerator appliances and dispenser assemblies for the same.

BACKGROUND OF THE INVENTION

Certain refrigerator appliances include a dispenser for directing ice from the refrigerator's ice maker and/or liquid water to the dispenser. A user can activate the dispenser in order to direct a flow of ice or liquid water into a cup or other container positioned within the dispenser. Liquid water directed to the dispenser is generally chilled or at an ambient temperature. However, certain refrigerator appliances also include features for dispensing heated liquid water.

Heated liquid water can be used to make certain beverages, such as coffee or tea. Refrigerators equipped to dispense heated liquid water can assist with making such beverages. However, such beverages are generally brewed at relatively high temperatures, and consumers generally consume such beverages at lower temperatures. Consuming beverages at relatively high brew temperatures or handling containers with beverages at relatively high brew temperatures can be inconvenient and undesirable.

Accordingly, a refrigerator appliance with features for cooling liquid within a container positioned in a dispenser of the refrigerator appliance would be useful.

BRIEF DESCRIPTION OF THE INVENTION

The present subject matter provides a dispenser assembly for a refrigerator appliance. The dispenser assembly includes a dispenser body that defines a dispenser recess. A heated liquid water outlet is configured for directing a flow of heated liquid water towards a container within the dispenser recess. The dispenser assembly also includes a cooling mechanism configured for selectively directing a flow of gaseous fluid towards the container within the dispenser recess. Additional aspects and advantages of the invention will be set forth in part in the following description, or may be apparent from the description, or may be learned through practice of the invention.

In a first exemplary embodiment, a refrigerator appliance is provided. The refrigerator appliance includes a cabinet that defines a chilled chamber for receipt of food items for storage. The cabinet also defines an opening for accessing the chilled chamber of the cabinet. A door is mounted to the cabinet at the opening of the cabinet in order to permit selective access to the chilled chamber of the cabinet through the opening of the cabinet. A dispenser is mounted to the door. The dispenser defines a dispenser recess. The dispenser is configured for directing a flow of heated liquid into the dispenser recess of the dispenser. A cooling mechanism is positioned at the dispenser. The cooling mechanism is configured for selectively directing a flow of gaseous fluid towards a container within the dispenser recess of the dispenser.

In a second exemplary embodiment, a dispenser assembly for a refrigerator appliance is provided. The dispenser assembly defines a vertical direction. The dispenser assembly includes a dispenser body that defines a dispenser recess. The dispenser recess extends between a top portion and a bottom portion along the vertical direction. A heated liquid water outlet is positioned at the top portion of the dispenser recess. The heated liquid water outlet is configured for directing a flow of heated liquid water towards a container within the dispenser recess. A cooling mechanism is positioned at the dispenser body. The cooling mechanism is configured for selectively directing a flow of gaseous fluid towards the container within the dispenser recess.

In a third exemplary embodiment, a dispenser assembly for a refrigerator appliance is provided. The dispenser assembly defines a vertical direction. The dispenser assembly includes a dispenser body that defines a dispenser recess. The dispenser recess extends between a top portion and a bottom portion along the vertical direction. A heated liquid water outlet is positioned at the top portion of the dispenser recess. The heated liquid water outlet is configured for directing a flow of heated liquid water towards a container within the dispenser recess. The dispenser assembly also includes means for selectively cooling the container within the dispenser recess.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 provides a front, elevation view of a refrigerator appliance according to an exemplary embodiment of the present subject matter.

FIG. 2 provides a front, elevation view of the exemplary refrigerator appliance of FIG. 1 with refrigerator doors of the exemplary refrigerator appliance shown in an open configuration to reveal a fresh food chamber of the exemplary refrigerator appliance.

FIG. 3 is a front, elevation view of a dispenser of the exemplary refrigerator appliance of FIG. 1.

FIG. 4 illustrates a method of operating a dispenser of a refrigerator appliance according to an exemplary embodiment of the present subject matter.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a front, elevation view of a refrigerator appliance 100 according to an exemplary embodiment of the present subject matter. FIG. 2 provides a front, elevation view of refrigerator appliance 100 with refrigerator doors 126 and 128 of refrigerator appliance 100 shown in an open position to reveal a fresh food chamber 122 of refrigerator appliance 100. Refrigerator appliance 100 defines a vertical direction V and a lateral direction L. The vertical direction V and lateral direction L are perpendicular to each other. Refrigerator appliance 100 extends between an upper portion 101 and a lower portion 102 along the vertical direction V. Refrigerator appliance 100 also extends between a first side portion 105 and a second side portion 106 along the lateral direction L.

Refrigerator appliance 100 includes a cabinet or housing 120 that defines chilled chambers for receipt of food items for storage. In particular, refrigerator appliance 100 defines fresh food chamber 122 at upper portion 101 of refrigerator appliance 100 and a freezer chamber 124 arranged below fresh food chamber 122 on the vertical direction V, e.g., at lower portion 102 of refrigerator appliance 100. As such, refrigerator appliance 100 is generally referred to as a bottom mount refrigerator appliance. However, using the teachings disclosed herein, one of skill in the art will understand that the present subject matter may be used with other types of refrigerator appliances (e.g., side-by-side style or top mount style) or a freezer appliance as well. Consequently, the description set forth herein is for illustrative purposes only and is not intended to limit the present subject matter in any aspect.

Refrigerator doors 126 and 128 are rotatably hinged to an edge of housing 120 for accessing fresh food compartment 122. In particular, refrigerator doors 126 and 128 are rotatably mounted to housing 120 at an opening 121 that permits access to fresh food chamber 122. A freezer door 130 is arranged below refrigerator doors 126 and 128 for accessing freezer chamber 124. Freezer door 130 is coupled to a freezer drawer (not shown) slidably mounted within freezer chamber 124.

Refrigerator appliance 100 also includes a dispensing assembly 110 for dispensing liquid water and/or ice. Dispensing assembly 110 includes a dispenser 114 positioned on or mounted to an exterior portion of refrigerator appliance 100, e.g., on refrigerator door 126. Dispenser 114 includes a discharging outlet 134 for accessing ice and liquid water. An actuating mechanism 132, shown as a paddle, is mounted below discharging outlet 134 for operating dispenser 114. In alternative exemplary embodiments, any suitable actuating mechanism may be used to operate dispenser 114. For example, dispenser 114 can include a sensor (such as an ultrasonic sensor) or a button rather than the paddle. A user interface panel 136 is provided for controlling the mode of operation. For example, user interface panel 136 includes a plurality of user inputs 137, such as a water dispensing button (not labeled) and an ice-dispensing button (not labeled), for selecting a desired mode of operation such as crushed or non-crushed ice. User interface panel 136 also includes a display 139 for presenting information to a user of refrigerator appliance 100.

Discharging outlet 134 and actuating mechanism 132 are an external part of dispenser 114 and are mounted in a dispenser recess 138 defined by a dispenser body 166 of dispenser 114. Dispenser body 166 is mounted to refrigerator door 126, e.g., at an outside surface of refrigerator door 126. Dispenser recess 138 is positioned at a predetermined elevation convenient for a user to access ice or water and enabling the user to access ice without the need to bend-over and without the need to access freezer chamber 124. In the exemplary embodiment, dispenser recess 138 is positioned at a level that approximates the chest level of a user.

Turning now to FIG. 2, certain components of dispensing assembly 110 are illustrated. Dispensing assembly 110 includes an insulated housing 142 mounted within fresh food chamber 122. Due to the insulation which encloses insulated housing 142, the temperature within insulated housing 142 can be maintained at levels different from the ambient temperature in the surrounding fresh food chamber 122.

Insulated housing 142 is constructed and arranged to operate at a temperature that facilitates producing and storing ice. More particularly, insulated housing 142 contains an ice maker for creating ice and feeding the same to a bucket 160 that is mounted on refrigerator door 126. As illustrated in FIG. 2, bucket 160 is placed at a vertical position on refrigerator door 126 that will allow for the receipt of ice from a discharge opening 162 located along a bottom edge 164 of insulated housing 142. As refrigerator door 126 is closed or opened, bucket 160 is moved in and out of position under insulated housing 142.

Operation of the refrigerator appliance 100 can be regulated by a controller 190 (shown schematically in FIG. 3) that is operatively coupled to user interface panel 136 and/or actuating mechanism 132. Panel 136 provides selections for user manipulation of the operation of refrigerator appliance 100 such as e.g., selections between whole or crushed ice, chilled water, and/or other options as well. In response to user manipulation of the user interface panel 136, controller 190 operates various components of the refrigerator appliance 100.

Controller 190 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 190 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Controller 190 may be positioned in a variety of locations throughout refrigerator appliance 100. In the illustrated embodiment, controller 190 is located within the control panel area of refrigerator door 126. In such an embodiment, input/output ("I/O") signals may be routed between controller 190 and various operational components of refrigerator appliance 100. The user interface 136 may be in communication with controller 190 via one or more signal lines or shared communication busses.

FIG. 3 is a front, elevation view of dispenser 114. As may be seen in FIG. 3, dispenser 114 extends between a top 175 and a bottom 176, e.g., along the vertical direction V. In addition, dispenser recess 138 extends between a top portion 167 and a bottom portion 168, e.g., along the vertical direction V.

Dispenser 114 includes a heated liquid water outlet 170. Heated liquid water outlet 170 is positioned at top portion 167 of dispenser recess 138 and is configured for directing a flow of heated liquid water (shown with arrows F) towards a container 172 positioned within dispenser recess 138. As an example, container 172 may be inserted within dispenser recess 138 in order to initiate a flow of heated liquid water into container 172. In particular, a user can insert container 172 into dispenser recess 138 until container 172 impacts activation member 132. The user can urge container 172 against activation member 132 until activation member 132 deflects towards a back of dispenser 114. When activation member 132 is in such a configuration, controller 190 initiates the flow of heated liquid water F into container 172.

Heated liquid water outlet 170 may be positioned within an ice outlet 171. Both heated liquid water outlet 170 and ice outlet 171 are components of the dispensing outlet 134 described above. Ice outlet 171 can direct ice from insulated housing 142 (FIG. 2) into container 172 in the manner described above. Conversely, heated liquid water outlet 170 is in fluid communication with a heated liquid water supply (not shown) such that heated liquid water outlet 170 may receive heated liquid water from the heated liquid water supply and direct such heated liquid water into container 172 as flow of heated liquid water F. It should be understood that the term "water supply" is used herein to encompass any manner or combination of valves, lines or tubing, housing, and the like, and may simply comprise a conventional (e.g., hot) water connection. As another example, refrigerator appliance 100 may include a water heating assembly (not shown) in certain exemplary embodiments. The water heating assembly can receive liquid water and heat such liquid water in order to generate heated liquid water for dispensing at heated liquid water outlet 170.

As discussed in greater detail below, dispenser 114 also includes features for regulating or adjusting a temperature of liquid within container 172. For example, dispenser 114 includes a cooling mechanism 180 configured for selectively directing a flow of gaseous fluid (shown with arrows G), e.g., a flow of air, towards container 172 positioned within dispenser recess 138. The flow of gaseous fluid G can be assist with, e.g., convective, heat transfer in order to reduce a temperature of liquid within container 172. Thus, cooling mechanism 180 can be oriented such that the flow of gaseous fluid G is directed towards an opening 174 of container 172 positioned at a top of container 172. Cooling mechanism 180 may be positioned at or mounted to dispenser body 166.

Cooling mechanism 180 can include any suitable mechanism for directing or forcing flow of gaseous fluid G towards container 172 positioned within dispenser recess 138. For example, in the exemplary embodiment shown in FIG. 3, cooling mechanism 180 includes a fan 182 that urges the flow of gaseous fluid G towards container 172 when fan 182 is activated and rotating. In certain exemplary embodiments, cooling mechanism 180 includes a conduit 184. Conduit 184 extends between a chilled chamber of refrigerator appliance 100, e.g., fresh food chamber 122 and/or freezer chamber 124, and dispenser recess 138. The chilled chamber can contain a gaseous fluid, such as air, with a relatively high pressure therein. Conduit 184 can direct the flow of gaseous fluid G from the chilled chamber into dispenser recess 138 when a valve of other suitable mechanism opens and permits flow of gaseous fluid G through conduit 184, e.g., due to the relatively high pressure gaseous fluid in the chilled chamber. Fan 182 may also be positioned within conduit 184 to assist the flow of gaseous fluid G through conduit 184.

Dispenser 114 also includes a temperature sensor 192. Controller 190 is in communication with temperature sensor 192. In particular, controller 190 is configured for using temperature sensor 192 to measure a temperature of liquid within container 172 positioned in dispenser recess 138. As an example, controller 190 can receive a signal from temperature sensor 192 with the signal corresponding to the temperature of liquid in container 172. Temperature sensor 192 is positioned at top portion 167 of dispenser recess 138, e.g., adjacent heated liquid water outlet 170.

Temperature sensor 192 can be any suitable mechanism for measuring a temperature of liquid in container 172. As an example, temperature sensor 192 may be an infrared temperature sensor that is directed to towards opening 174 of container 172 as shown in FIG. 3. In alternative exemplary embodiments, temperature sensor 192 may be a thermocouple, a thermistor, etc.

Dispenser 114 also includes a heating mechanism 194. Heating mechanism 194 is configured for selectively heating container 172 positioned within dispenser recess 138. As an example, controller 190 can selectively activate heating mechanism 194 in order to heat container 172 when a temperature of liquid within container 172 drops below a predetermined temperature. The predetermined temperature can be any suitable temperature and can be selected or programmed by a user. As an example, the predetermined temperature may be between about one hundred and thirty degrees Fahrenheit and about one hundred and sixty degrees Fahrenheit. Heating mechanism 194 may be positioned at or mounted to dispenser body 166. In particular, heating mechanism 194 may be positioned at bottom portion 168 of dispenser recess 138, e.g., such that container 172 rests on a top surface of heating mechanism 194 as shown in FIG. 3.

Heating mechanism 194 can include any suitable mechanism for heating container 172. For example, heating mechanism 194 may include a radiant heating element or a conductive heating element. In particular, heating element 194 may include an electric resistance heating element, a microwave heating element, etc.

FIG. 4 illustrates a method 400 of operating a dispenser assembly of a refrigerator appliance according to an exemplary embodiment of the present subject matter. Method 400 can be used to operate any suitable dispenser assembly. As an example, method 400 may be used to operate dispenser 114 (FIG. 3) of refrigerator appliance 100 (FIG. 1). Controller 190 may be programmed to implement method 400. Utilizing method 400, a temperature of liquid within container 172 can be adjusted or modified.

At step 410, a flow of heated liquid is directed into container 172. As an example, controller 190 can actuate a valve (not shown) in order to initiate the flow of heated liquid water F through heated liquid water conduit 170 into container 172 positioned within dispenser recess 138 at step 410. After container 172 is full or a suitable volume of heated liquid water has been dispensed, controller 190 can close the valve in order to terminate the flow of heated liquid water F.

At step 420, a temperature of liquid in container 172 is measured. Controller 190 can utilize temperature sensor 192 to measure the temperature of liquid in container 172 at step 420. In particular, controller 190 can receive a signal from temperature sensor 192 at step 420 with the signal corresponding to the temperature of liquid within container 172.

At step 430, controller 190 determines whether the temperature of liquid in container 172 exceeds a threshold temperature. If the temperature of liquid within container 172 exceeds the temperature threshold at step 430, the flow of gaseous fluid G is directed towards container 172 at step 440. Thus, controller 190 activates cooling mechanism 180 in order to force or urge the flow of gaseous fluid G towards container 172 at step 440 if the temperature of liquid within container 172 exceeds the temperature threshold at step 430. The flow gaseous fluid G can assist with cooling liquid in container 172 until the temperature of liquid in container 172 does not exceed the threshold temperature. In particular, the temperature of liquid in container 172 is remeasured at step 450, and the flow of gaseous fluid G continues to cool liquid in container 172 until the temperature of liquid in container 172 does not exceed the threshold temperature at step 430. In such a manner, method 400 can assist with cooling liquid in container 172 until the liquid is at or below the threshold temperature.

The temperature threshold can be any suitable temperature and can be selected or programmed by a user of dispenser 114. As an example, the threshold temperature may be between about one hundred and thirty degrees Fahrenheit and about one hundred and sixty degrees Fahrenheit. As another example, the threshold temperature may be between about one hundred and forty degrees Fahrenheit and about one hundred and fifty degrees Fahrenheit.

Coffee and other heated beverages can be brewed with heated liquid water at a temperature exceeding two hundred degrees Fahrenheit. Consuming beverages at such temperatures can be uncomfortable and undesirable. Method 400 can assist with cooling such beverages to a more comfortable and desirable temperature for consumption.

Method 400 can also include activating heating mechanism 194. In particular, controller 190 can activate heating mechanism 194 if the temperature of liquid within container 172 drops below an additional threshold temperature. Thus, as an example, if a user leaves container 172 within dispenser recess 138 until liquid within container 172 drops below the additional threshold temperature, controller 190 can activate heating mechanism 194 in order to heat liquid in container 172 to a more suitable temperature for consumption or maintain liquid in container 172 at a suitable temperature for consumption. Alternatively, controller 190 can activate heating mechanism 194 in order to reduce a rate of temperature change of liquid in container 172.

As will be understood by those skilled in the art, method 400 can also operate as an open loop rather than relying on feedback from temperature sensor 192 as shown in FIG. 4. Thus, controller 190 can include a model for the temperature of liquid within container 172 and can operate cooling mechanism 180 and heating mechanism 194 to adjust the temperature of liquid in container 172 to a desired temperature based at least in part on the model for the temperature of liquid within container 172.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance, comprising:
    a cabinet that defines a chilled chamber for receipt of food items for storage, the cabinet also defining an opening for accessing the chilled chamber of the cabinet;
    a door mounted to the cabinet at the opening of the cabinet in order to permit selective access to the chilled chamber of the cabinet through the opening of the cabinet;
    a dispenser mounted to the door, the dispenser defining a dispenser recess, the dispenser configured for directing a flow of heated liquid into the dispenser recess of the dispenser;
    a cooling mechanism positioned at the dispenser, the cooling mechanism configured for selectively directing a flow of gaseous fluid towards a container positioned within the dispenser recess of the dispenser;
    a temperature sensor; and
    a controller in communication with the temperature sensor, the controller configured for measuring, with the temperature sensor, a temperature of a liquid in the container positioned within the dispenser recess of the dispenser.

2. The refrigerator appliance of claim 1, wherein the cooling mechanism comprises a fan.

3. The refrigerator appliance of claim 1, wherein the cooling mechanism comprises a conduit extending between the chilled chamber of the cabinet and the dispenser recess of the dispenser.

4. The refrigerator appliance of claim 1, wherein the controller is further configured for activating the cooling mechanism if the temperature of the liquid in the container positioned within the dispenser recess of the dispenser exceeds a temperature threshold.

5. The refrigerator appliance of claim 4, wherein the temperature threshold is between about one hundred and thirty degrees Fahrenheit and about one hundred and sixty degrees Fahrenheit.

6. The refrigerator appliance of claim 1, wherein the temperature sensor comprises an infrared temperature sensor.

7. The refrigerator appliance of claim 1, wherein the dispenser recess extends between a top portion and a bottom portion along a vertical direction, the temperature sensor positioned at the top portion of the dispenser recess.

8. The refrigerator appliance of claim 1, further comprising a heating mechanism, the dispenser recess extending between a top portion and a bottom portion along a vertical direction, the heating mechanism positioned at the bottom portion of the dispenser recess, the heating mechanism configured for selectively heating the container positioned within the dispenser recess of the dispenser.

9. The refrigerator appliance of claim 8, wherein the heating mechanism comprises a radiant heating element or a conductive heating element.

10. A dispenser assembly for a refrigerator appliance, the dispenser assembly defining a vertical direction, the dispenser assembly comprising:
    a dispenser body defining a dispenser recess, the dispenser recess extending between a top portion and a bottom portion along the vertical direction;
    a heated liquid water outlet positioned at the top portion of the dispenser recess, the heated liquid water outlet configured for directing a flow of heated liquid water towards a container positioned within the dispenser recess; and
    a cooling mechanism positioned at the dispenser body, the cooling mechanism configured for selectively directing a flow of gaseous fluid towards the container positioned within the dispenser recess.

11. The dispenser assembly of claim 10, wherein the cooling mechanism comprises a fan.

12. The dispenser assembly of claim 10, further comprising a controller and a temperature sensor, the controller being in communication with the temperature sensor, the controller configured for measuring, with the temperature sensor, a temperature of a liquid in the container positioned within the dispenser recess.

13. The dispenser assembly of claim 11, wherein the controller is further configured for activating the cooling mechanism if the temperature of the liquid in the container positioned within the dispenser recess exceeds a temperature threshold.

14. The dispenser assembly of claim 11, wherein the temperature threshold is between about one hundred and thirty degrees Fahrenheit and about one hundred and sixty degrees Fahrenheit.

15. The dispenser assembly of claim 11, wherein the temperature sensor comprises an infrared temperature sensor.

16. The dispenser assembly of claim 11, wherein the temperature sensor is positioned at the top portion of the dispenser recess.

17. The dispenser assembly of claim 10, further comprising a heating mechanism, the heating mechanism positioned at the bottom portion of the dispenser recess, the heating mechanism configured for selectively heating the container positioned within the dispenser recess.

18. The dispenser assembly of claim 16, wherein the heating mechanism comprises a radiant heating element or a conductive heating element.

* * * * *